US006962725B2

(12) United States Patent
McFadden, Sr. et al.

(10) Patent No.: US 6,962,725 B2
(45) Date of Patent: Nov. 8, 2005

(54) LOW TEMPERATURE PROCESS FOR EXTRACTING PRINCIPAL COMPONENTS FROM PLANTS OR PLANT MATERIALS AND PLANT EXTRACTS PRODUCED THEREBY

(75) Inventors: Patrick G. McFadden, Sr., Hackettstown, NJ (US); Dennis A. Ross-Morrey, Hackettstown, NJ (US)

(73) Assignee: Naturel Corporation, LLC, Hackettstown, NJ (US)

( * ) Notice: Subject to any disclaimer, the term of this patent is extended or adjusted under 35 U.S.C. 154(b) by 334 days.

(21) Appl. No.: 10/164,057

(22) Filed: Jun. 5, 2002

(65) Prior Publication Data

US 2002/0187245 A1  Dec. 12, 2002

Related U.S. Application Data

(60) Provisional application No. 60/296,220, filed on Jun. 6, 2001.

(51) Int. Cl.$^7$ ............................................. A23L 1/222
(52) U.S. Cl. ...................... 426/651; 426/425; 426/428; 426/429; 426/534; 426/615; 426/650
(58) Field of Search ................................ 426/425, 428, 426/429, 430, 534, 615, 629, 638, 650, 651

(56) References Cited

U.S. PATENT DOCUMENTS

| | | | |
|---|---|---|---|
| 5,301,694 A | * | 4/1994 | Raymond et al. ........... 131/297 |
| 6,013,304 A | | 1/2000 | Todd |
| 6,063,381 A | | 5/2000 | Staggs |
| 6,190,685 B1 | | 2/2001 | Karita |
| 6,383,526 B1 | | 5/2002 | Andrews et al. |

OTHER PUBLICATIONS

Rombauer et al., Joy of Cooking, 1975, The Bobbs-Merrill Company, Inc., Indianapolis/New York, p. 577.*

* cited by examiner

*Primary Examiner*—Leslie Wong
(74) *Attorney, Agent, or Firm*—Holland & Bonzagni, P.C.; Mary R. Bonzagni, Esq.

(57) ABSTRACT

A low temperature process for extracting principal components from plants or plant materials and plant extracts produced by such a low temperature process, are provided. The inventive low temperature process improves the yield and quality of volatile and non-volatile components extracted from plants or plant materials.

17 Claims, 1 Drawing Sheet

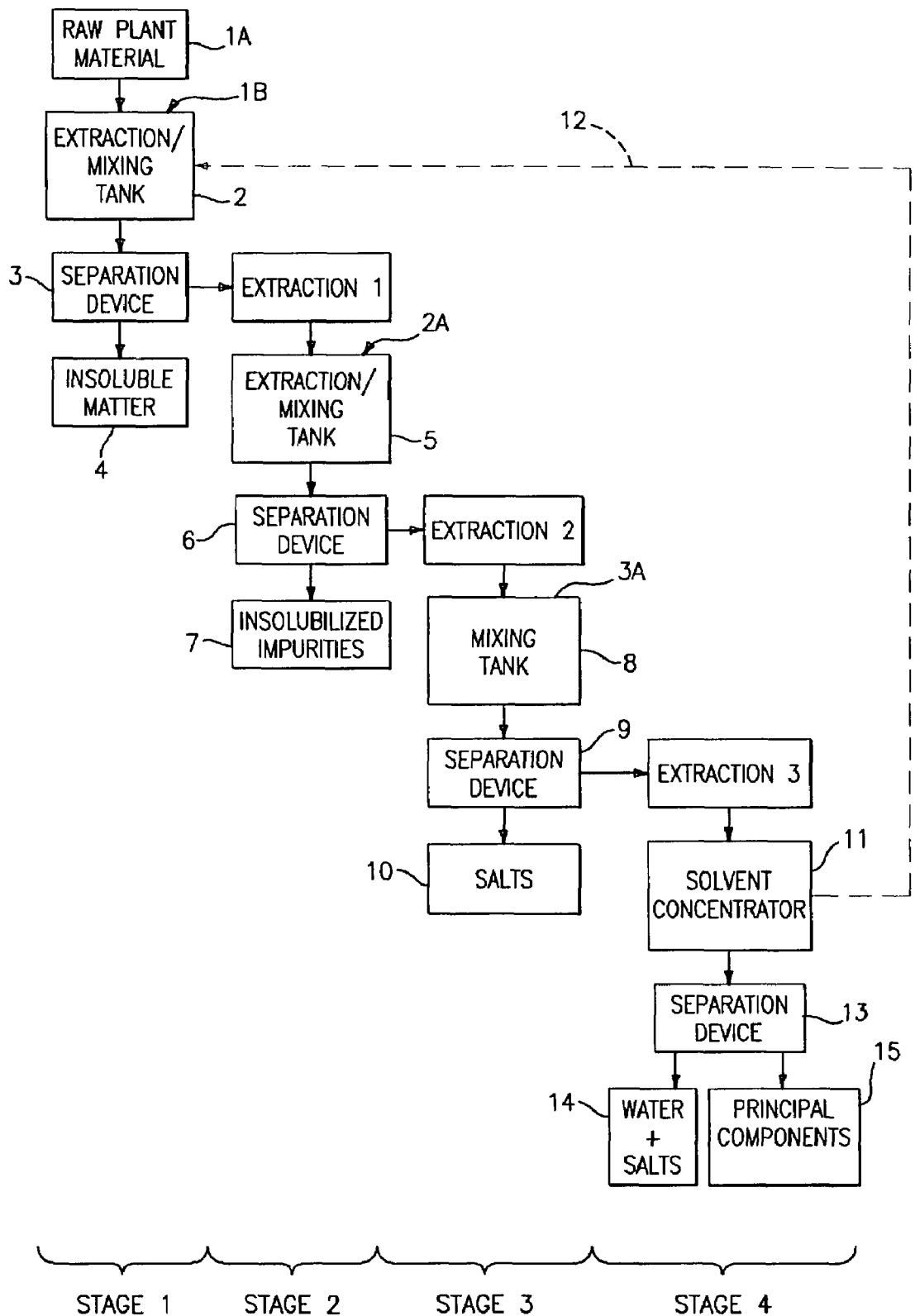
*FIGURE*

LOW TEMPERATURE PROCESS FOR EXTRACTING PRINCIPAL COMPONENTS FROM PLANTS OR PLANT MATERIALS AND PLANT EXTRACTS PRODUCED THEREBY

RELATED APPLICATION

This application claims the benefit of U.S. Provisional Patent Application Ser. No. 60/296,220, filed Jun. 6, 2001.

FIELD OF THE INVENTION

The present invention generally relates to a low temperature process for extracting principal components from plants or plant materials, and to plant extracts produced by such a low temperature process. The present invention more particularly relates to a process, which improves the yield and quality of volatile, and non-volatile components extracted from plants or plant materials and to the high quality plant extracts produced thereby.

BACKGROUND OF THE INVENTION

Plants or plant materials contain both volatile and non-volatile components, which collectively dictate unique odor and/or flavor profiles. Volatile components, such as essential oils, provide a plant or plant material with a distinctive odor, while non-volatile components, such as resins, provide a plant or plant material with a distinctive flavor or taste. Plants or plant materials also contain non-volatile components, which are inert (e.g., cellulose, lignin, ash). Such components are commonly referred to as "impurities".

Non-volatile components from certain plants or plant materials (e.g., medicinal plants) may influence or cause certain physiological effects and, in some instances, may provide certain health benefits. Such components, which include alkaloids, antioxidants and steroids, are commonly referred to as "active principals".

An essential oil is a volatile mixture of esters, aldehydes, alcohols, ketones and terpenes, which can be prepared from plants and plant parts. Examples of essential oils include oil of cinnamon, prepared from the dried bark of the roots of Cinnamomum zeyloriaceae, cajeput oil, eucalyptus oil, prepared from the fresh leaves and branches of various species of Eucalyptus, and fennel oil, prepared from dried ripe fruit of *Foeniculum vulgare*.

Essential oils are mainly responsible for the unique or characteristic aroma of a plant or plant material, and are typically prepared by subjecting the plant or plant material to a distillation process. A number of different distillation procedures are known. One such procedure involves injecting/distilling a plant bed with steam, condensing the steam and separating the oil phase from the aqueous phase to obtain the essential oil.

Oleoresins are mixtures of essential oils and resins and are described as representing the complete flavor profile of plants or plant materials. It is noted that the resinous or non-volatile component of oleoresins provides these materials with added stability when subjected to heat during food processing. This feature is recognized as a major advantage over essential oils.

Current oleoresin extraction technology involves extraction with one or more solvents followed by removal of the solvent(s) by evaporation. One such procedure involves soaking plants or plant materials in one or more solvents (e.g., a mixture of ethanol and water for extraction of vanilla, hexane for extraction of numerous varieties of spices) and removing sufficient quantities of the solvent(s) from the resulting extract. For example, approximately 35% ethanol in vanilla extracts, and less than 25 parts per million (ppm) hexane in spice extracts are considered acceptable solvent levels.

The volatile and non-volatile components, including essential oils and oleoresins, which are extracted from plants or plant materials tend to have different aroma and flavor characteristics from those of the natural plant. The diminished quality of these extracted materials is due, in part, to thermal degradation of the components, which occurs during extraction, and to the presence of impurities (e.g., lignin), which remain in the plant extract.

A need exists for an extraction process, which addresses the problems of thermal degradation and the presence of impurities in resulting plant extracts.

It is therefore an object of the present invention to provide such a process.

It is a more particular object of the present invention to provide a low temperature process for extracting volatile and non-volatile components (i.e., principal components) from plants or plant materials.

It is yet a more particular object to provide a process, which improves the yield and quality of principal components extracted from plants or plant materials.

It is a further object to provide a high quality plant extract, which retains the active principals, and the natural aroma, color, and flavor of the plant, or plant material from which it was obtained.

SUMMARY OF THE INVENTION

The present invention therefore relates to a low temperature process for extracting principal components from plants or plant materials, wherein the process comprises:

(a) contacting raw plant material with an extracting organic polar solvent to form a solution containing principal components, impurities, and insoluble matter;

(b) separating the insoluble matter from the solution to form a first extraction solution;

(c) raising the pH of the first extraction solution to greater than 7 by adding a quantity of a base to form a solution containing principal components and insolubilized impurities;

(d) separating the insolubilized impurities from the solution to form a second extraction solution;

(e) neutralizing the second extraction solution by adding a quantity of an acid to form a solution containing principal components and salts; and (f) separating the principal components from the salts and from the organic polar solvent and recovering same.

The present invention also relates to a plant extract prepared by the low temperature process described immediately hereinabove.

The present invention further relates to a plant extract, which retains the active principals, and the natural aroma, color, and flavor of the plant, or plant material from which it was obtained.

The foregoing and other features and advantages of the present invention will become more apparent from the following drawing and description.

BRIEF DESCRIPTION OF THE DRAWINGS

The FIGURE is a schematic process flow diagram depicting the main features of the low temperature and multi-stage process of the present invention

DETAILED DESCRIPTION OF THE INVENTION

Applicants, by way of the present invention, have made the surprising discovery that a base is instrumental in removing impurities from a solvent extraction solution. In specific regard to cinnamon, Applicants have found that the addition of potassium hydroxide to a solvent extraction solution containing volatile and non-volatile components (e.g., essential oils, oleoresins, active principals), and impurities (e.g., lignin), will result in the precipitation of the impurities. This discovery, coupled with the fact that low temperatures (i.e., $\leq 70°$ C.) are maintained throughout the inventive process, assure the recovery of a high quality plant extract which retains the active principals, and the natural aroma, color, and flavor of the plant or plant material from which it was extracted.

For ease of reference, the volatile and non-volatile components identified above, with the exception of-inert non-volatile components such as cellulose, lignin and ash, will be collectively referred to as "principal components".

The inventive process, in addition to assuring a high quality plant extract, is more efficient in terms of time, taking only a fraction of the time taken by prior art extraction processes. More specifically, high quality plant extracts are obtained in from about 40 minutes to about 24 hours (preferably from about 4 to about 6 hours) using the present inventive process, while plant extracts obtained via prior art extraction techniques are obtained over the course of several days.

The low temperature process of the present invention may be used to extract principal components from any genus or species of plant or plant material. Examples of plants or plant materials from which plant extracts have been prepared using the inventive process include, but are not limited to, Cinnamon Ceylon, Cinnamon Cassia, Vanilla, Coffee and Black and White Pepper.

The plant extracts of the present invention may provide certain health benefits. While research is currently underway, Applicants believe that at least some of the extracts contemplated by the present invention may serve to reduce risk of, treat, cure or mitigate disease.

Referring now to the low-temperature process of the present invention, it is noted that due to the rigid structure of cell walls, only a few plants or plant materials are amendable to extraction in their natural forms. It is, therefore, preferred that the plants or plant materials used in the low-temperature process of the present invention be reduced in size so as to enable a solvent to substantially penetrate the resulting mass. In a more preferred embodiment, the plants or plant materials are ground, cut, or shredded to an average particle size ranging from about 0.10 to about 1.0 millimeters (mm). In yet a more preferred embodiment, the ground, cut, or shredded plants or plant materials have a moisture content ranging from about 2 to about 50% by wt., based on the total weight of the plant or plant material.

For plants or plant materials which are basic and/or which cannot be ground, cut, or shredded to an average particle size falling within the range noted above, the low temperature process of the present invention may advantageously include an additional pH reduction step, which will be described in more detail below.

The main features of a preferred embodiment of the low temperature and multi-stage process for extracting principal components from plants or plant materials of the present invention are shown in the schematic process flow diagram labeled FIGURE. The process shown in the FIGURE will be discussed in further detail below.

1. Stage 1—First Extraction Process.

The first stage of the inventive process, which is labeled as Stage 1 on the diagram, is a first extraction process. The starting material (i.e., optionally ground, cut, or shredded raw plants or plant materials) is identified by the reference numeral 1A. An organic polar solvent 1B is used to extract principal components from the starting material 1A in this first extraction process.

Organic polar solvents 1B useful in the present invention include alcohols, preferably $C_1$ to $C_4$ alcohols (e.g., methanol, ethanol), ketones, preferably $C_3$ to $C_5$ ketones (e.g., acetone), and esters. These solvents may be used alone, as a mixture, or mixed with other solvents, such as water.

In a preferred embodiment, the organic polar solvent 1B is a non-toxic, non-carcinogenic solvent. In a more preferred embodiment, the organic polar solvent 1B is food-grade ethanol or ethyl alcohol.

It has been found that suitable slurries can by obtained by adding a quantity of from about 10 to about 35 parts by volume (more preferably from about 20 to about 30 parts by volume) of starting material 1A to 100 parts by volume of organic polar solvent 1B.

In one embodiment of the present invention, where the starting material 1A is cassia cinnamon and the organic polar solvent 1B is food-grade ethanol (190 proof), it is preferred that a quantity of from about 20 to about 30 parts by volume of the cassia cinnamon plant material, having an average particle size ranging from about 0.25 to about 1.0 mm, and a moisture content ranging from about 5 to about 15% by wt., based on the total weight of the cassia cinnamon material, is added to 100 parts by volume of food-grade ethanol.

The first extraction process is preferably started by simultaneously feeding the optionally ground, cut, or shredded starting material 1A and the organic polar solvent 1B into an extractor/mixing tank 2. Organic polar solvent 1B may, however, be added directly to starting material 1A prior to feeding starting material 1A into extraction/mixing tank 2. Extraction/mixing is then conducted within tank 2 on the resulting slurry at a constant temperature for a predetermined contact period. The constant temperature for the first extraction process preferably ranges from about 10 to about 70° C. (more preferably from about 20 to about 40° C.), and the contact period preferably ranges from about 10 minutes to about 24 hours (more preferably from about 1 hour to about 4 hours).

As noted above, for plants or plant materials which are basic and/or which cannot be reduced to an average particle size ranging from about 0.10 to 1.0 mm, the low temperature process of the present invention may advantageously include an additional pH reduction step. More specifically, it is preferred that a quantity of from about 0.01 to about 5.0% by wt., based on the total weight of starting material 1A, of an acid be added to the slurry contained in extractor/mixer tank 2 prior to extraction/mixing.

Suitable acids include, but are not limited to, hydrochloric acid, sulfuric acid, citric acid, and the like. The HCl, $H_2SO_4$, $C_6H_8O_7AH_2O$ or other acids may be used neat or combined with a quantity of organic polar solvent 1B.

In a preferred embodiment, the acid is HCl.

Following the extraction/mixing, the slurry is separated into a liquid fraction and a solid fraction, at 3. Separation is accomplished using e.g. filtration or centrifuge techniques. In a preferred embodiment, separation is accomplished by high-speed centrifugation.

The liquid fraction obtained from this first separation is labeled Extraction 1 on the schematic process flow diagram depicted in the FIGURE, and comprises principal components and impurities (e.g., lignin), dissolved in the organic polar solvent 1B.

The solid fraction (labeled insoluble matter 4 in the FIGURE) comprises plant solids (i.e., spent cellulose). The plant solids 4 may be discarded or subjected to e.g. a residual glucose extraction process. As will be readily appreciated by those skilled in the art, extracted glucose may be fermented, distilled, and then refined into ethanol.

2. Stage 2—Second Extraction Process.

The second stage of the inventive process, which is labeled as Stage 2 on the diagram, is a second extraction process. A base 2A is used to precipitate impurities (e.g., lignin) dissolved in the organic polar solvent 1B.

Bases suitable for use with the present invention include, but are not limited to, sodium hydroxide, potassium hydroxide, cesium hydroxide, calcium hydroxide, and the like. The NaOH, KOH, CsOH, $Ca(OH)_2$, or other bases may be used neat or combined with a quantity of the organic polar solvent, or with organic polar solvent-water mixtures.

In a preferred embodiment, the base 2A is potassium hydroxide.

Sufficient quantities of base 2A are added to Extraction 1 to bring the pH to a value of from about 7 to about 13.5, and preferably from about 10 to about 13.5. In a preferred embodiment, the concentration of base 2A ranges from about 1 to about 1% by weight, based on the total weight of starting material 1A (more preferably, from about 3 to about 7% by weight).

In one embodiment of the present inventive process, the starting material 1A is cassia cinnamon, the organic polar solvent 1B is food-grade ethanol (190 proof), and a quantity of from about 6 to about 7% by weight, based on the total weight of the cassia cinnamon starting material 1A, of KOH is added to Extraction 1.

The second extraction process is preferably started by simultaneously feeding Extraction 1 and base 2A into an extractor/mixing tank 5. Base 2A may, however, be added directly to Extraction 1 prior to feeding Extraction 1 into extractor/mixing tank 5. Extraction/mixing is then conducted within tank 5 on the resulting slurry at a constant temperature for a predetermined contact period. The constant temperature for the second extraction process preferably ranges from about 10 to about 70° C. (more preferably from about 20 to about 40° C.), and the contact period preferably ranges from about 0.1 to about 20 minutes (more preferably from about 2 to about 5 minutes).

Following the extraction/mixing, the slurry is separated into a liquid fraction and a solid fraction, at 6. Again, separation is accomplished using e.g. filtration or centrifuge techniques. In a preferred embodiment, separation is accomplished by high-speed centrifugation, as described hereinabove.

The liquid fraction obtained from this second separation is labeled Extraction 2 on the schematic process flow diagram depicted in the FIGURE, and comprises principal components dissolved in base 2A and organic polar solvent 1B.

The solid fraction (labeled insolubilized impurities 7 in the FIGURE) comprises impurities. In a preferred embodiment, where cinnamon is used as starting material 1A, the solid fraction comprises lignin. It is noted that in this preferred embodiment, the lignin may be discarded or sold to various users of this material.

At this stage, the liquid fraction or Extraction 2 is basic.

3. Stage 3—Third Extraction Process.

The third stage of the inventive process, which is labeled as Stage 3 on the diagram, is a third extraction process. An acid 3A is used to neutralize Extraction 2.

Acids suitable for use with the present invention include, but are not limited to, hydrochloric acid, sulfuric acid, citric acid, and the like. The HCl, $H_2SO_4$, $C_6H_8O_7AH_2O$ or other acids may be used neat or combined with a quantity of organic polar solvent 1B. Sufficient quantities of acid 3A are added to neutralize Extraction 2.

In a preferred embodiment, the acid 3A is hydrochloric acid.

The third extraction process of the present inventive process is preferably started by simultaneously feeding Extraction 2 and acid 3A into an extraction/mixing tank 8. Acid 3A may, however, be added directly to Extraction 2 prior to feeding Extraction 2 into extractor/mixing tank 8. Extraction/mixing is then conducted within tank 8 on the resulting slurry at a constant temperature for a predetermined contact period. The constant temperature for the third stage preferably ranges from about 10 to about 70° C. (more preferably from about 20 to about 40° C.), and the contact period preferably ranges from about 0.10 to about 10 minutes (more preferably from about 3 to about 5 minutes).

Following the extraction/mixing, the slurry is separated into a liquid fraction and a solid fraction, at 9. Separation is accomplished using e.g. filtration or centrifuge techniques. In a preferred embodiment, separation is accomplished by high-speed centrifugation, as described hereinabove.

The liquid fraction obtained from this third separation is labeled Extraction 3 on the schematic process flow diagram depicted in the FIGURE, and comprises principal components and salts dissolved in organic polar solvent 1B.

The solid fraction (labeled salts 10 in the FIGURE) comprises salts. As will be readily apparent to those skilled in the art, when base 2A is KOH, the solid fraction would comprise salts of potassium chloride. The recovered salts are discarded.

4. Stage 4—Removal of Organic Polar Solvent.

The fourth stage, which is labeled as Stage 4 on the diagram, is a final stage in the present inventive process, which serves to separate the organic polar solvent 1B and dissolved salts from the principal components.

The fourth stage is started by continuously or batch feeding Extraction 3, under vacuum, into a solvent concentrator 11. The temperature within solvent concentrator 11 is set at the flash point of the organic polar solvent 1B. Recovered organic polar solvent 1B may be directed into extraction/mixing tank 2 via feed-line 12, and recycled within the present inventive process.

While low temperatures are maintained throughout the inventive process, it is particularly necessary to do so within solvent concentrator 11, where exposing Extraction 3 to temperatures higher than the solvent flash point will tend to drive volatile components (e.g., essential oils) off along with organic polar solvent 1B. The use of higher temperatures may also serve to degrade the final product or extract.

Following the removal of organic polar solvent 1B, any water present, which may contain dissolved salts, is decanted off in separation device 13 and recovered at 14, while principal components are recovered at 15.

The present inventive process provides improved yield and quality of principal components from plants or plant materials. Moreover, the inventive process is cost-effective in that spent solids can, for the most part, be either further refined or sold for other end-uses, while the organic polar solvent 1B may be recycled. In addition, the inventive process takes only a fraction of the time taken by prior art extraction processes.

The plant extracts of the present invention are high quality plant extracts which retain the active principals, and the natural aroma, color, and flavor of the plant or plant material from which they are extracted.

In a preferred embodiment, the inventive plant extract is a vanilla extract which comprises from about 10 to about 25% by weight, based on the total weight of the extract, of vanillin or vanillic aldehyde.

In another preferred embodiment, the inventive plant extract is a cinnamon extract, which comprises from about 30 to about 60% by weight, based on the total weight of the extract, of cinnamic aldehyde.

Having thus described the invention, what is claimed is:

1. A low temperature process for extracting principal components from plants or plant materials, wherein the process comprises:
    (a) contacting raw plant material with an extracting organic polar solvent to form a solution containing principal components, impurities, and insoluble matter;
    (b) separating the insoluble matter from the solution to form a first extraction solution;
    (c) raising the pH of the first extraction solution to greater than 7 by adding a quantity of a base to form a solution containing principal components and insolubilized impurities;
    (d) separating the insolubilized impurities from the solution to form a second extraction solution;
    (e) neutralizing the second extraction solution by adding a quantity of an acid to form a solution containing principal components and salts; and
    (f) separating the principal components from the salts and from the organic polar solvent and recovering same.

2. The low temperature process of claim 1, wherein the temperature maintained throughout the process is less than or equal to 70° C.

3. The low temperature process of claim 1, wherein the principal components are essential oils, oleoresins and active principals.

4. The low temperature process of claim 1, wherein the raw plant material is selected from the group of Cinnamon Ceylon, Cinnamon Cassia, Vanilla, Coffee and Black and White Pepper raw plant materials.

5. The low temperature process of claim 1, wherein the raw plant material has an average particle size ranging from about 0.10 to about 1.0 millimeter.

6. The low temperature process of claim 5, wherein the raw plant material has a moisture content ranging from about 2 to about 50% by weight, based on the total weight of the raw plant material.

7. The low temperature process of claim 1, wherein the raw plant material is basic or cannot be reduced to an average particle size ranging from about 0.10 to about 1.0 millimeter and wherein the process further comprises adding a quantity of acid to the raw plant material and organic polar solvent prior to forming a solution containing principal components, impurities, and insoluble matter.

8. The low temperature process of claim 1, wherein the extracting organic polar solvent is selected from the group of alcohols, ketones, esters and mixtures thereof.

9. The low temperature process of claim 8, wherein the extracting organic polar solvent is mixed with water.

10. The low temperature process of claim 8, wherein the extracting organic polar solvent is food-grade ethanol.

11. The low temperature process of claim 1, wherein from about 10 to about 35 parts by volume of raw plant material is contacted with 100 parts by volume of extracting organic polar solvent.

12. The low temperature process of claim 1, wherein the base is selected from the group of sodium hydroxide, potassium hydroxide, cesium hydroxide, calcium hydroxide and mixtures thereof.

13. The low temperature process of claim 12, wherein the base is combined with a quantity of the organic polar solvent or with a quantity of a mixture of the organic polar solvent and water.

14. The low temperature process of claim 12, wherein the base is potassium hydroxide.

15. The low temperature process of claims 1 or 7, wherein the acid is selected from the group of hydrochloric acid, sulfuric acid, citric acid and mixtures thereof.

16. The low temperature process of claim 15, wherein the acid is combined with a quantity of the organic polar solvent.

17. The low temperature process of claim 15, wherein the acid is hydrochloric acid.

* * * * *

UNITED STATES PATENT AND TRADEMARK OFFICE
CERTIFICATE OF CORRECTION

PATENT NO. : 6,962,725 B2
DATED : November 8, 2005
INVENTOR(S) : Patrick G. MaFadden, Sr. et al.

It is certified that error appears in the above-identified patent and that said Letters Patent is hereby corrected as shown below:

Column 5,
Line 38, change "1% by weight" to -- 10% by weight --.

Signed and Sealed this

Seventh Day of February, 2006

JON W. DUDAS
*Director of the United States Patent and Trademark Office*